US007526555B2

(12) United States Patent
Shahindoust

(10) Patent No.: US 7,526,555 B2
(45) Date of Patent: Apr. 28, 2009

(54) SMART CARD PRINTING

(75) Inventor: Amir Shahindoust, Laguna Niguel, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 1013 days.

(21) Appl. No.: 10/396,857

(22) Filed: Mar. 25, 2003

(65) Prior Publication Data

US 2004/0190038 A1 Sep. 30, 2004

(51) Int. Cl.
*G06F 15/16* (2006.01)
*G06F 7/04* (2006.01)

(52) U.S. Cl. ........................... 709/227; 709/217; 726/3; 726/4; 726/21

(58) Field of Classification Search ................. 709/227, 709/217; 726/3, 4, 21
See application file for complete search history.

(56) References Cited

U.S. PATENT DOCUMENTS 4,918,723 A 4/1990 Iggulden et al.
5,311,595 A 5/1994 Bjerrum et al.
5,552,897 A 9/1996 Mandelbaum et al.
5,633,932 A * 5/1997 Davis et al. ................. 713/176
5,717,923 A * 2/1998 Dedrick ...................... 707/102
5,721,781 A 2/1998 Deo et al.
RE36,310 E 9/1999 Bjerrum et al.
5,970,218 A 10/1999 Mullin et al.
6,178,507 B1 1/2001 Vanstone
6,362,893 B1 3/2002 Francis et al.
6,393,567 B1 5/2002 Colnot
6,577,239 B2 * 6/2003 Jespersen ................. 340/572.1
6,806,976 B1 * 10/2004 Suyehira .................... 358/1.14
7,032,047 B2 * 4/2006 DiRaimondo et al. ....... 710/200
7,113,300 B2 * 9/2006 Strobel et al. .............. 358/1.15
2001/0039583 A1 * 11/2001 Nobakht et al. ............. 709/227
2001/0056402 A1 * 12/2001 Ahuja et al. ................... 705/43
2002/0175208 A1 * 11/2002 Bartley et al. ............... 235/380
2003/0028783 A1 * 2/2003 Collins et al. ............... 713/182
2003/0160997 A1 * 8/2003 Kimura ..................... 358/1.15
2003/0217166 A1 * 11/2003 Dal Canto et al. ........... 709/229
2004/0034654 A1 * 2/2004 Simpson et al. ......... 707/103 R
2004/0174556 A1 * 9/2004 Lapstun et al. ............. 358/1.14

* cited by examiner

*Primary Examiner*—Kenny S Lin
(74) *Attorney, Agent, or Firm*—Tucker Ellis & West LLP

(57) ABSTRACT

A system utilizing a Bluetooth enabled smart card to authenticate a user and provide the user with access to a service. The Bluetooth smart card system is comprised of a server and a client. The server is the component that resides on the device that provides the service to the user. The server initializes the system to receive service requests. Once there is a request, the server establishes a communication channel and reads the user identification from the client. The server determines if it matches user identification from a database. If so, the server then determines if the requested service is supported and then performs the services. The server then determines if there is a need to charge for the service. The server would then get billing information from the card and adds the charge to the credit card of the user.

18 Claims, 3 Drawing Sheets

SMART CARD PRINTING

BACKGROUND OF THE INVENTION

The present invention pertains generally to wireless communication systems and, more particularly, to a method and system of communication between peripherals and a smart card utilizing wireless technology.

A method for authenticating a user using a personal identification number is well known. For example, a user may desire a print job requiring confidentiality over a network wide printer. In order to be able to secure the document so that it prints only when the owner of the print job is at the printer, there is a method well known in the art called private print. The private print method is taught in U.S. Pat. No. 5,970,218, hereby incorporated by reference, in which, the owner of the job enters a personal identification number when creating the job and then at the printer to order the release of the job. However, this can be a difficult encumbrance if one is required to do it on most of his or her print jobs. Furthermore, if one forgets the personal identification number, the Private Print document will remain in the printer's memory forever or until the expiration of such jobs. A method in which the user does not have to enter and remember a password is therefore desirable.

Another situation in which authenticating a user presents inherent difficulty arises in the guise of a print/copy shop, wherein a number of different users access a copier or printer. A copy shop must either keep track of the number of copies or printouts they have or to give a counter to the user to attach it to the printer or copier to start the operation. The user would then be charged by the number recorded on the counter. A method so that the printer or copier can recognize the user and automatically bill his or her credit card is therefore needed.

The use of a key, an alphanumeric keypad or identification card to access a door is well known. The number entered on the keypad or the possession of the identification card provides a presumption of the user's identity. Authentication by these means present the same inherent difficulties for the user. The user must remember the correct number to enter on the keypad or must have the identification card out to present to a security card or a keyless entryway. A method that removes the need for a key, alphanumeric code or the identification card for opening the doors as soon as the individual approaches is therefore desirous.

Thus, a method and system that will authenticate a user and provide the user with access to different services using a single identification device is needed.

SUMMARY OF THE INVENTION

In accordance with the present invention, there is a method for utilizing a Bluetooth enabled smart card to authenticate a user and provide the user with access to a service, the steps comprising receiving a service request, wherein the service request is associated with the smart card, storing the service request on a server, wherein the server resides on a device that performs the service request, and authenticating the user by matching a user identification from the smart card with a stored user identification stored on a database. After the request is received, the user approaches the server with the smart card and the server authenticates and establish a communications channel with the smart card. User identification is then read from the smart card by the server. The server then matches the user identification transmitted from the smart card to user identification stored in a database. Provided the user identification contained in the database matches that stored on the smart card, the server then determines if the requested service is supported and that the user is authorized to use the requested service. The service is then performed.

Further in accordance with the present invention is a method for using a Bluetooth enabled smart card to authenticate a user and provide the user with access to a printer, the steps comprising, receiving a private print job with a personal identification number, storing the private print job at a controller, and authenticating the user by matching user information and a user personal identification number from the smart card with the personal identification number from the private print job. The print job is sent with a personal identification number. When the controller at the server receives the print job from the user, the controller recognizes the print job as a private print job and stores the private print job in a private print queue. Since Bluetooth links are limited in range, the print job cannot begin until the smart card is brought within range of the controller. Once the user moves to pick up his or her print job, the controller compares the personal identification number on the smart card with the personal identification numbers of private print jobs in the private print queue. The controller then sends the private print job from the private print queue to the printer. This alleviates the need for the user to manually enter a personal identification number to begin printing. The present invention may further allow for automatic charging to a credit card account by determining a charge for the service request, retrieving information on a billing account from the smart card, accessing the billing account information from the database, and charging the billing account for the service request. The requested service, such as a copy request or print request, may carry a charge for performance, for which the server then may receive billing information from the smart card. The server may then match the billing information from the smart card with that credit card or account information stored on the database. The smart card verifies the user and authorizes the charge to occur. The service request is then processed and the charges are made accordingly.

Further in accordance with another aspect of the present invention, is a system for utilizing a Bluetooth enabled smart card to authenticate a user and provide the user with access to a printer, comprising means adapted for receiving a service request, wherein the service request is associated with the smart card, means adapted for storing the service request on a server, wherein the server resides on a device that performs the service request, and means adapted for authenticating the user by matching a user identification from the smart card with a stored user identification stored on a database communicatively coupled to the server.. The smart card contains user identification, usually in the form of a personal identification number. Similarly, the database contains user identification in the same format as that of the smart card. When the personal identification numbers are matched, the user is identified and the requested service may be performed.

Still other embodiments of the present invention will become readily apparent to those skilled in the art from the following description wherein there is shown and described a preferred embodiment of this invention, simply by way of illustration of one of the best modes best suited for to carry out the invention. As it will be realized, the present invention is capable of other different embodiments and its several details are capable of modifications in various obvious aspects all without from the invention. Accordingly, the drawing and descriptions will be regarded as illustrative in nature and not as restrictive.

While the present invention would typically be implemented in both hardware and software, as those skilled in the art can readily appreciate, the present invention may be implemented in either hardware or software, or a combination thereof.

BRIEF DESCRIPTION OF THE FIGURES

The accompanying drawings incorporated in and forming a part of the specification, illustrate several aspects of the present invention, and together with the description server to explain the principals of the invention. In the drawings.

These and additional embodiments of the invention may now be better understood by turning to the following detailed description wherein an illustrated embodiment is described.

DETAILED DESCRIPTION OF THE PREFERRED EMBODIMENTS

The present invention is directed to a system and method for using a Bluetooth enabled smart card to authenticate a user and provide the user with access to different services. Although the present invention is described as enabling a user to utilize a smart card to authenticate and access services using Bluetooth wireless communications, it will be appreciated by those skilled in the art that the present invention is also suitably adapted to incorporate any wireless communications means, such as any IEEE 802.11x, infrared, cellular, or other wireless communication channels. Throughout this description, the preferred embodiment and examples shown should be considered as exemplars, rather than limitations, of the present invention.

Figure 1:
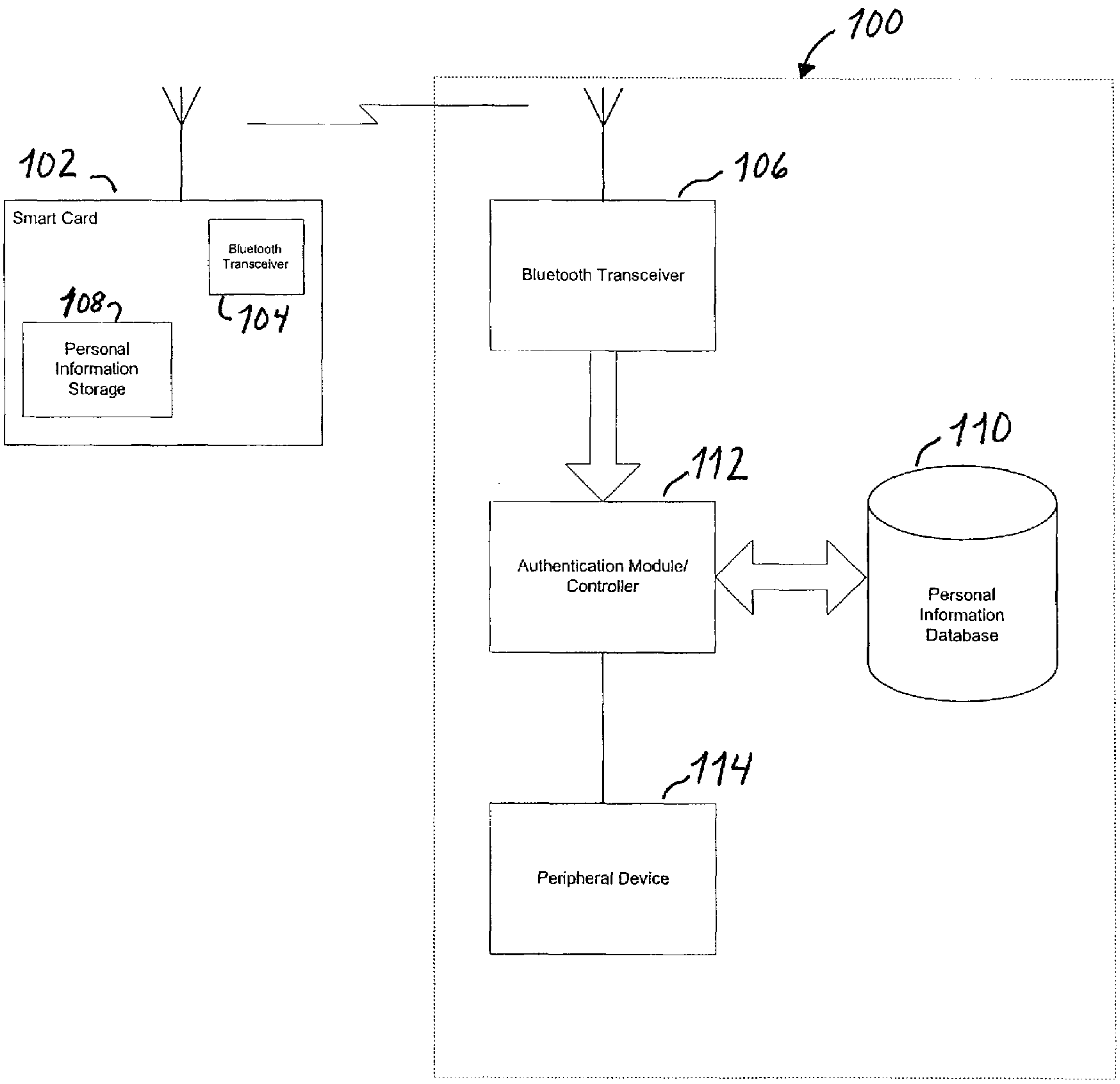
FIG. 1 is a block diagram of a smart card detection system.

Referring first to FIG. 1, there is shown a block diagram of a Smart Card Detection System contemplated by the present invention. A Bluetooth enabled smart card 102 comprises an integrated Bluetooth transceiver 104 and a user identification storage 108. The user identification storage 108 may consist of any method for storing data currently known in the art. The Bluetooth enabled smart card 102 represents the client end of the client-server relationship. The server end 100 consists of a Bluetooth transceiver 106 communicatively coupled to an authentication module 112. The authentication module 112 may also be referred to as a controller 112 and are intended to represent the same component of server 100. Communicatively coupled to the controller 112 is a user identification database 110, wherein resides the information of users. The information of a user may vary, depending upon the type of information the user desires to store on the database 110 and access through the Bluetooth enabled smart card 102. Such information, for example, could include a personal identification number, a credit card account, a billing address, a driver's license number, social security number, or other means of identification or billing information. Operatively coupled to the controller 112 is the peripheral device 114. The peripheral device 114 may comprise a number of different devices capable of performing a service for the user. Such peripheral devices 114 may include, but need not be limited to, a printer, copier, multifunction peripheral, a locking mechanism, or an ignition switch. The server 100 resides on the device providing the service to the user. Alternatively, all components of the server 100 need not reside on the device, however, the Bluetooth transceiver 106 and the controller 112 need to be present on the device providing the service to the user.

Figure 2:
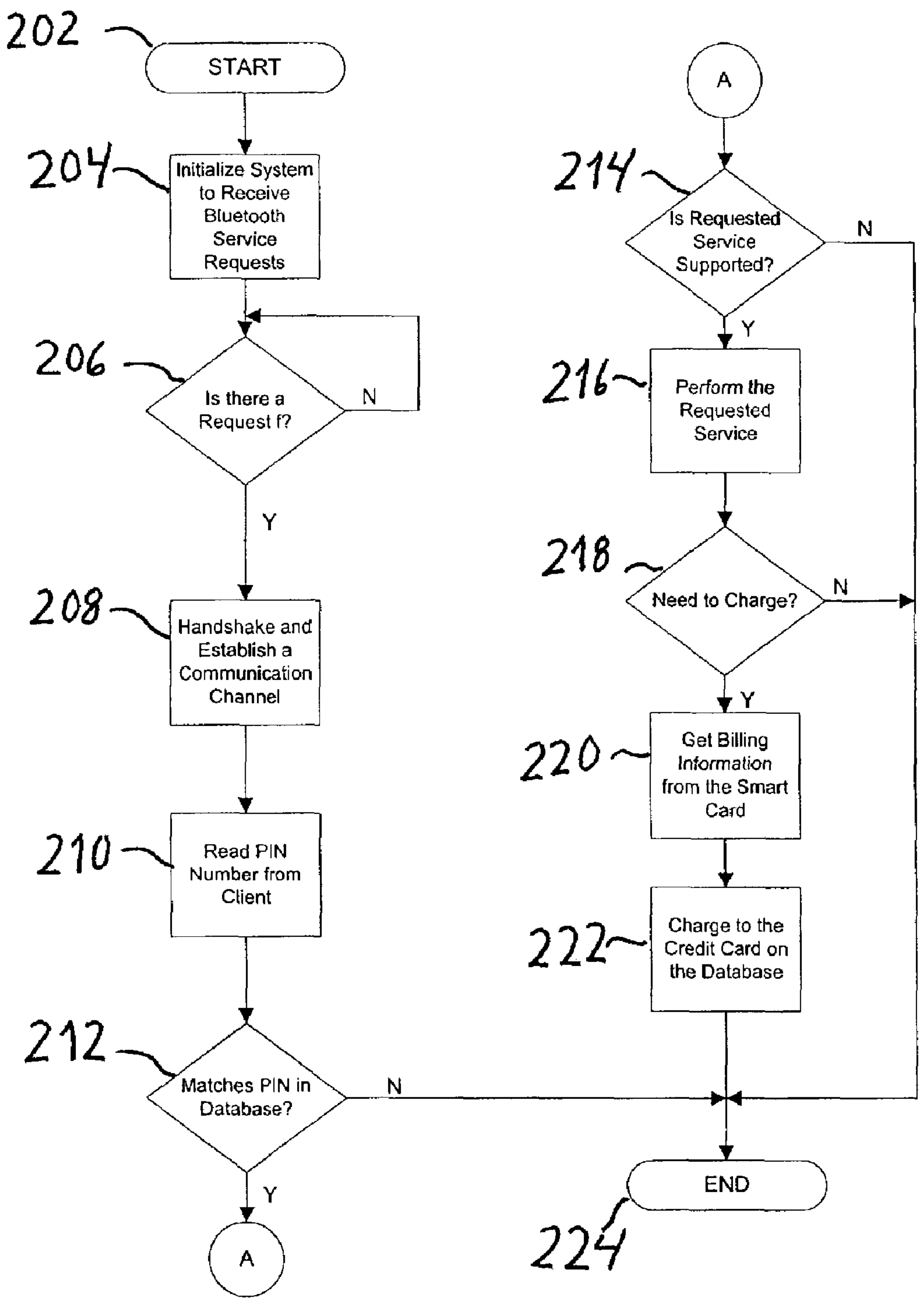
FIG. 2 is a flow chart of a process contemplated by the present invention.

Referring now to FIG. 2, there is illustrated a flow chart of a method contemplated by the present invention, as viewed from the server end of the server-client relationship. The method begins with step 202. At step 204, the server 100 initializes the system to receive Bluetooth service requests. Upon a determination in step 206 that a service request has been received, the system proceeds to step 208. In step 208, the server 100 and the Bluetooth enabled smart card 102 authenticate and establish a communications channel. This communications channel represents the radio frequency utilized by Bluetooth enabled equipment, that is, using the 2.4 GHz frequency range. Since the range of any Bluetooth transceiver is limited to approximately 10 meters, the server Bluetooth transceiver 106 and the Bluetooth enabled smart card 102 need to be within the aforementioned range of each other. The server 100 then reads identification information from the client Bluetooth enabled smart card 102 in step 210. This identification information may take the form of a personal identification number, but need not be so limited.

The server 100, using the controller 112 accesses the user identification database 110 in step 212 to determine if the personal identification information of the user read from the Bluetooth enabled smart card 102 in step 210 matches the personal identification information of the user stored in the database 110. A negative determination in step 212 results in progressing the method to step 224, wherein the server 100 terminates the connection established between the server 100 and the Bluetooth enabled smart card 102. Upon positive determination of a match in step 212, the server 100 is able to authenticate the user and verify the user is authorized to access the services available on the server 100. Subsequently, the server 100 then in step 214 must determine that the service requested in step 206 is supported. Confirming that the service requested in step 206 is supported, the server 100 performs the service in step 216.

The method exemplified in FIG. 2 allows for the charging of a fee to the user if the supported service requires such payment. As step 218 prompts, the server 100 then determines if the service requested in step 206 requires a charge. A negative determination progresses the method to termination in step 224 after completion of the service performed in step 216. A positive determination in step 218 indicates to the server 100 to access billing information from the Bluetooth enabled smart card 102 in step 220. Such billing information from the Bluetooth enabled smart card 102 need not be the actual account number, but rather may be file name or number for the server 100 to access on the database 110 to retrieve an account number for billing of the user for the service performed in step 216. Upon receipt of the billing information from the Bluetooth enabled smart card in step 220, the server 100 charges the account of the user in step 222, as indicated by the billing information stored on the database 110.

Figure 3:
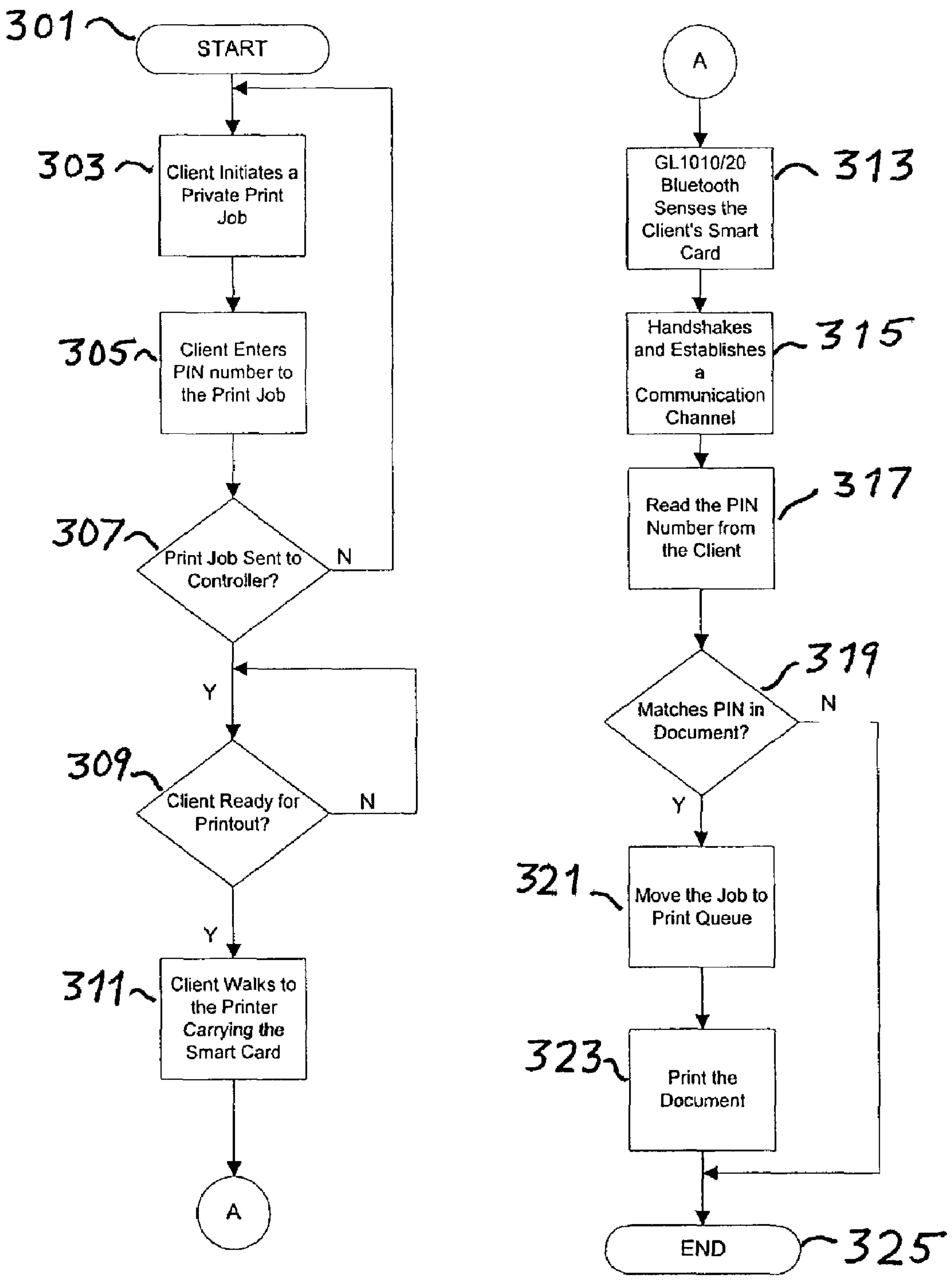
FIG. 3 is a flow chart of an alternate embodiment of the present invention depicting a private printing process.

Referring now to FIG. 3, there is illustrated a method for private printing which utilizes the private print method such as that disclosed in the above incorporated U.S. Pat. No. 5,970,218. The present invention utilizes the controller 112, the peripheral device 114, the user identification database 110, the Bluetooth transceiver 106 of the server 100 and the Bluetooth enabled smart card 102. The system begins at step 301. At step 303, the user initiates a private print job. The initiation of a private print job is accomplished using a printer driver suitably adapted for private printing and selecting private print. The user then enters his or her personal identification number to the private print job at step 305. The private print job is then sent to the controller 112 in step 307. Upon a determination that the private print job was not sent to the controller 112 in step 307, the system returns to step 301 for reinitiating the private print job. Once the print job has been sent to the controller 112 in accordance with step 307, the print job is identified by the controller 112 as a private print job whereby the controller 112 stores the print job in the private print queue, until the user is ready for printout in step 309.

The Bluetooth enabled smart card 102 contains the integrated Bluetooth transceiver 104, which ordinarily has an effective broadcast range of approximately 10 meters, dependent upon interference from other electronic devices, such as a wireless telephone. This limitation allows for the print job to wait at the controller 112 until such time as the user transports the Bluetooth enabled smart card 102 to the peripheral device 114, which in the present example is a printer, in accordance with step 311. The controller 112 then senses the Bluetooth enabled smart card 102 when the user enters range of the Bluetooth transceiver 106 of the controller 112. An example of compatible controllers which may be used with the present invention are the Toshiba GL 1010 or GL1020 Printer Controllers available from Toshiba American Business Solutions, Inc., 2 Musick Irvine, Calif. 92618-1631.

Upon sensing the Bluetooth enabled smart card 102 in step 313, the controller 112 in step 315 then authenticates and establishes a communications channel with the Bluetooth enabled smart card 102. Once the communication channel is established, the controller 112 determines the identity of the user by reading the personal identification number stored on the Bluetooth enabled smart card 102 in step 319. The controller 112 then compares the personal identification number read from the Bluetooth enabled smart card 102 to the personal identification numbers of all private print jobs stored in the private print queue. In accordance with step 321, the controller 112 determines that the personal identification number of the Bluetooth enabled smart card 102 matches the personal identification number of a print job stored in the private print queue and the controller 112 then converts the print job to an urgent print and moves the print job to be the next job printed. Thus, the user is authenticated and the print job is ready to print. The job is then printed in step 323 and the process terminates at step 325.

An alternative option to the flow chart of FIG. 3 would insert steps 218-222 (FIG. 2) following step 323. This option allows for example, a copy shop, to charge a user for documents printed. Once the document is printed according to step 323, the controller 112 would then determine if the print job performed requires a charge to the user as in step 218. Upon the determination that the print job performed incurred charges, the controller 112, in step 220, would access the Bluetooth enabled smart card 102 for billing information on the user. After receiving the billing information from the Bluetooth enabled smart card 102, the controller 112 would then access the user identification database 110 to retrieve the account information of the corresponding user, as shown in step 222. Thus, the user's account is debited or charged for the printjob automatically.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for utilizing a Bluetooth enabled smart card to authenticate a user and provide the user with access to a service, comprising the steps of:

receiving a plurality of document processing operation service requests, each service request corresponding to at least one document, wherein each service request is associated with a corresponding smart card and identification data fixedly stored thereon;

storing each service request on a server, wherein the server resides on a device that performs each service request;

encrypting at least one electronic document in accordance with key data generated from corresponding identification data via the server:

receiving, into the server, at least one encrypted electronic document corresponding to each service request;

storing each received electronic document in a data storage associated with the server:

wirelessly identifying an existence of an identified smart card while proximate to a document processing device adapted to perform the service request;

wirelessly obtaining user identification data from the identified smart card;

isolating at least one electronic document in the server corresponding to the identified smart card;

elevating a processing priority of the at least one isolated electronic document relative to other received electronic documents stored on the server;

regenerating the key data from user identification data obtained from the identified smart card at the document processing device;

decrypting the at least one electronic document in accordance with generated key data;

authenticating the user by matching user identification from the smart card with a stored user identification stored on a database communicatively coupled to the server;

enabling operation of the document processing device to perform the service request on the at least one document in accordance with the step of authenticating without user intervention; and generating cost data associated with the user identification data in accordance with a completion of a performance of the service request.

2. The method of claim 1, further comprising authenticating the smart card by the server.

3. The method of claim 1, wherein the service request is received from a client.

4. The method of claim 3, wherein the smart card is associated with the client.

5. The method of claim 1, further comprising the step of recording a number of the supported service requests performed.

6. The method of claim 1, wherein the device comprises one of the group consisting of a printer, a copier, a multifunction printer, an ignition switch, a door lock and a multifunction peripheral.

7. The method of claim 6, wherein the multifunction peripheral is at least one of the group consisting of an image input device and an image output device.

8. The method of claim 7, wherein the image input device is at least one of the group consisting of a scanner, a copier, and a facsimile device.

9. The method of claim 7, wherein the image output device is at least one of the group consisting of a copier, a facsimile, and a printer.

10. The method of claim 1, further comprising the steps of:

retrieving information on a billing account from the smart card;

accessing the billing account from the stored user identification in the database; and charging the billing account for the requested service.

11. The method of claim 10, wherein the stored user identification comprises one of the group consisting of a personal identification number, a billing account, a credit card number, and a customer identification number.

12. The method of claim 1, the authenticating step further comprising matching a personal identification number from the smart card with a personal identification number stored on a database communicatively coupled to the server.

13. A system for utilizing a Bluetooth enabled smart card to authenticate a user and provide the user with access to a service, comprising:

means adapted for receiving a plurality of document processing service requests, each service request corresponding to at least one document, wherein each service request is associated with a corresponding smart card and identification data fixedly stored thereon;

means adapted for storing each service request on a server, wherein the server resides on a device that performs the service request;

means adapted for encrypting at least one electronic document in accordance with key data generated from corresponding identification data via the server;

means adapted for receiving, into the server, at least one encrypted electronic document corresponding to each service request;

means adapted for storing each received, encrypted electronic document in a data storage associated with the server;

means adapted for wireless identifying an existence of an identified smart card while proximate to a document processing device adapted to perform the service request;

means adapted for wirelessly obtaining user identification data from the identified smart card;

means adapted for isolating at least one electronic document in the server corresponding to the identified smart card;

means adapted for elevating a processing priority of the at least one isolated electronic document relative to other received electronic documents stored on the server;

means adapted for regenerating key data from user identification data obtained from the identified smart card at the document processing device;

means adapted for decrypting the at least one electronic document in accordance with generated key data;

means adapted for authenticating the user by matching user identification from the smart card with a stored user identification stored on a database communicatively coupled to the server;

means adapted for enabling operation of the document processing device to perform the service request on the at least one document in accordance with the authentication without user intervention; and means adapted for generating cost data associated with the user identification in accordance with a completion of the service request.

14. The system of claim 13, further comprising means adapted for recording a number of the supported service requests performed.

15. The system of claim 13, further comprising:

means adapted for retrieving information on a billing account from the smart card;

means adapted for accessing the billing account from the stored user identification in the database; and means adapted for charging the billing account for the requested service.

16. The system of claim 13, wherein the device comprises one of the group consisting of a printer, a copier, a multifunction printer, an ignition switch, a door lock and a multifunction peripheral.

17. The system of claim 13, wherein the stored user identification comprises one of the group consisting of a personal identification number, a billing account, a credit card number, and a customer identification number.

18. The system of claim 13, further comprising means for establishing a communications channel between the smart card and the server.

* * * * *